3,304,287
PROCESS FOR PREPARING LINEAR COPOLYMERS CONTAINING OXYMETHYLENE AND UNITS DERIVED FROM SATURATED OXAZINES
Kornel D. Kiss, University Heights, Ohio, assignor to Diamond Alkali Company, Cleveland, Ohio, a corporation of Delaware
No Drawing. Filed May 20, 1963, Ser. No. 281,774
20 Claims. (Cl. 260—67.6)

This invention relates to novel thermoplastic compositions having a high degree of thermal stability. More particularly, it relates to copolymers containing oxymethylene units in combination with units derived from a tetrahydro oxazine or a substituted derivative of said saturated oxazine, and still more particularly, relates to such copolymers wherein the oxazine constituent is derived from morpholine or from a substituted morpholine.

Oxymethylene polymers are well known in the art. They may be prepared by polymerizing under substantially anhydrous conditions formaldehyde or by polymerizing trioxane which is a cyclic trimer of formaldehyde. These polymers are thermoplastic materials of varying molecular weight composed of recurring oxymethylene —$CH_2O$— monomer units joined together in linear chains which may be terminated at one or at both ends by thermally-unstable hydroxyl groups, depending upon the method of preparation. As prepared, oxymethylene polymers will be degraded in varying degrees when exposed to elevated processing temperatures. Prior to processing, therefore, these polymers are usually further treated, such as by chain end-group "capping," i.e., by converting the unstable hydroxyl groups to more stable ester or ether groups, and/or by incorporating therewith stabilizing additives, which will inhibit markedly polymer degradation.

It is an object of this invention, therefore, to provide a polymeric composition structurally related to polyoxymethylene which may be satisfactorily processed as prepared without first being further treated to stabilize it against degradation.

It is another object to provide a polymer composition having a high degree of thermal stability which may suitably be employed to prepare tough and durable plastic articles such as films, moldings, extrusions and the like.

It is still another object to provide tough and durable plastic articles such as described above from an oxymethylene copolymer composition having a high degree of thermal stability.

These and other objects will become apparent to those skilled in the art by a description of the invention which follows.

In general, the present invention comprises preparing novel polymeric compositions by polymerizing under substantially anhydrous conditions and in the presence of an ionic-type polymerization catalyst, either formaldehyde or trioxane, with a saturated oxazine having the structure

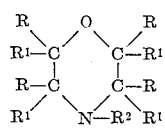

wherein R and $R^1$ can be the same or different members selected from the group consisting of hydrogen, and alkyl, substituted alkyl, alkoxy, cycloalkoxy, substituted cycloalkoxy, aryl, substituted aryl, heterocyclic, substituted heterocyclic and nitro radicals; and $R^2$ is selected from the group consisting of hydrogen, halogen, alkyl, substituted alkyl, acyl, substituted acyl, aryl, substituted aryl, heterocyclic, substituted heterocyclic, diheterocyclic and substituted diheterocyclic and nitroso radicals.

The copolymer products obtained are solid, medium to high molecular weight materials comprised of —$CH_2O$— monomer units and units having the structure $$\pm O—(CRR^1)_2—NR^2—(CRR^1)_2\pm$$

and/or $$\pm(CRR^1)_2—O—(CRR^1)_2—NR^2\pm$$

wherein R, $R^1$ and $R^2$ are as defined above. These copolymers exhibit sufficient thermal stability so that they may be processed at elevated temperatures without first being stabilized as by capping of their end groups. Additionally, they also may be processed without the use of stabilizing additives therewith.

The oxazines which may be employed to prepare the copolymers of this invention are tetrahydro-1,4-oxazine, commonly referred to in the art as morpholine, and derivatives of morpholine in which substituents such as alkyl radicals having from 1 to about 20 carbon atoms, acyl radicals having from 2 to about 7 carbon atoms, aryl radicals, heterocyclic radicals, halogen radicals and nitrogen-containing radicals, e.g., a nitroso group, are attached to the nitrogen of the morpholine ring. Of these derivatives, especially preferred for use are N-methyl morpholine, N-ethyl morpholine, N-acetyl morpholine and N-phenyl morpholine. However, other morpholine derivatives within the context of this invention and which may also be satisfactorily employed are those compounds having on any or all of the ring-carbons substituted groups, such as for example, halogen and alkyl radicals of from 1 to about 8 carbon atoms, alkoxy radicals having at least 1 carbon atom, cycloalkoxy radicals, aryl radicals and nitro radicals. Additionally, these compounds may also be substituted on the nitrogen as well as on the ring carbons. Specific compounds of this class include 2,6-diethyl morpholine, 2,6-dimethyl - 4 - octadecyl morpholine, 2-ethoxy-4-ethyl-2-phenyl morpholine, 2-ethyl morpholine, 2-methyl morpholine, 3-methyl morpholine, 3-methyl-2-phenyl morpholine, 2- or 3-oxacyclohexylmethyl morpholines, nitro morpholine and the like.

The copolymer compositions of this invention are surprising in that heretofore it has not been known to polymerize saturated oxazines such as morpholine and its derivatives, as described above. In this invention, copolymerization is effected by an opening of the oxazine ring which occurs usually at the C—O bond or at the C—N bond. The linear oxazine monomer units resulting are then incorporated along with the oxymethylene monomer units in the growing polymeric chain and the copolymer product obtained contains recurring oxymethylene groups interspersed with oxazine groups having the structure as defined above. These oxazine comonomer units may be randomly distributed within the polymer chain and/or also may be present therein as comonomer blocks, i.e., segments of the polymer chain comprising at least two of the oxazine units sequentially joined together with no oxymethylene unit between them.

The copolymer products of this invention may contain generally from about 0.1 percent, by weight, up to about 50 percent, by weight, of the saturated oxazine groups, which percentage is determined by elemental nitrogen analysis of the copolymer. That is to say, these copolymers may contain from about 0.03 up to about 17 mole percent of the oxazine groups, or as expressed differently, in the polymeric chain there will be from about 83 to 99.97 percent of oxymethylene repeating units and from about 0.03 up to about 17 percent of repeating oxazine units. Thus, depending upon the saturated oxazine employed the copolymer composition may contain, for example, up to about 17 mole percent of groups derived from morpholine, up to about 15 mole percent of those derived from N-methyl morpholine, up to about 12 mole percent of N-acetyl morpholine groups, or up to about 9 to 10 mole percent of N-phenyl morpholine groups. However, the preferred copolymers contain from about 90 up to about 99.9 percent of oxymethylene repeating units and from about 0.1 up to about 10 percent of the oxazine repeating units, i.e., these copolymers contain from about 0.1 up to 10 mole percent of saturated oxazine groups or from about 0.3 percent up to 30 percent of said groups, by weight.

As described previously, the copolymers of this invention are medium to high molecular weight materials. In order to produce finished plastic articles having useful property levels, these polymers usually will have an inherent viscosity of at least 1, which value corresponds to an average polymer molecular weight of approximately 15,000. Copolymers most suitably employed usually have an inherent viscosity of at least 1.2, which value corresponds to an average polymer molecular weight of about 30,000. Inherent viscosity is determined by dissolving the polymer in p-chlorophenol which contains 2 percent, by weight of a-pinene, and then measuring at 60° C. the viscosity of the polymer solution relative to that of the solvent obtained in the same manner. The time of efflux through a viscometer is measured for the solvent and for the solution of polymer in solvent. The concentration of polymer in the solution is 0.5 percent. From the efflux that is obtained inherent viscosity is calculated as follows:

$T_0$ = solvent flow time in seconds
$T_1$ = solution flow time in seconds $$\text{Relative viscosity} = \frac{T_1}{T_0}$$

Inherent viscosity =

$$\frac{\text{The natural logarithm of relative viscosity}}{C}$$

where C is the concentration of polymer as expressed in grams per 100 ml. of solution.

Depending upon both the type and percentage of the saturated oxazine present in the copolymer products of this invention, these materials have melting points which are significantly lower than, about the same as, or somewhat above that of oxymethylene homopolymer, i.e., these copolymers normally have melting points within the range of about 110° to 190° C. In appearance, they resemble oxymethylene homopolymer, and those having similar melting points likewise exhibit properties similar to polyoxymethylenes.

In contrast to unstabilized polyoxymethylenes which decompose rapidly when subjected to elevated processing temperatures, the novel copolymers of this invention exhibit sufficient stability at such temperatures that they may be processed as prepared without being further treated, e.g., as by hydroxyl end-group "capping" or by physical admixture with additives, to prevent or greatly inhibit their degradation. However, these copolymers may be capped by incorporating ester or ether groups at the end of any polymer chain which terminates with an oxymethylene unit, especially if in processing the copolymer is exposed to elevated temperatures for excessively long periods of time.

As described previously, the copolymerization reaction is effected in the presence of an ionic-type polymerization catalyst such as Friedel-Crafts metal halide catalysts, e.g., the halides of boron, aluminum, tin, antimony and the like; organometallic catalysts, such as butyl lithium, diethyl zinc, tributyl boron, phenyl magnesium bromide, methyl aluminum dichloride and the like; and coordinate complexes of metal halides, e.g., boron trifluoride, with organic compounds in which sulfur and, particularly, oxygen or nitrogen is the donor atom. The metal halide catalysts or their coordinate complexes are preferably employed when preparing copolymers from trioxane. In general, the catalyst may be used in an amount ranging from about 0.001 to 10 percent, by weight of the total monomer charge. However, an amount within the range of about 0.005 to 1 percent, by weight of the monomer charge, is preferably employed.

The reaction may be conducted in any anhydrous organic solvent for the monomers which is inert to the comonomers and to the catalyst and which has a melting point lower than the reaction temperatures. Aliphatic, cycloaliphatic and aromatic hydrocarbons or their halogenated or nitro derivatives are generally employed, with aliphatic, cycloaliphatic and aromatic hydrocarbons containing 3 to 12 carbon atoms per molecule, e.g., n-heptane, cyclohexane or toluene, being especially preferred.

It is preferable that the copolymerization process be conducted under anhydrous or substantially anhydrous conditions. Therefore, the catalyst solution employed is prepared and then kept in a nitrogen atmosphere, the reaction liquid medium is dried prior to use, and the process is carried out entirely under nitrogen.

In carrying out the reaction, temperatures ranging from about −80° C. to about +100° C. and reaction times of about 1 to 7 hours may generally be employed. Preferably, the reaction is conducted at a temperature ranging from −70° C. to +50° C. and for a time period of from 2 to 4 hours.

The copolymer products of this invention may be used to prepare articles such as moldings, films, sheets, rods, tubes, fibers, filaments and the like by molding and/or extrusion processes such as are practiced at the present time. In processing, these products may be used alone or may be modified with additives such as antioxidants, fillers, pigments, stabilizers, processing aids and the like.

In order that those skilled in the art may more completely understand the present invention and the preferred methods by which the same may be carried into effect, the following specific examples may be offered.

*Example 1*

A one-liter, four-neck polymerization flask is fitted with an agitator, a thermometer well, a reflux condenser, a rubber serum cap for catalyst injection and with inlet and outlet tubes for passage of nitrogen and formaldehyde vapors. A one-liter, three-neck flask used as a pyrolyzer to supply oxymethylene monomer to the polymerizer is fitted with a thermometer well and with gas inlet and outlet tubes, and is electrically heated. It is connected to the polymerization flask by means of a U-tube, 1 inch in diameter and about 10 inches long, which is positioned in a Dewar flask. Before assembly, the equipment is cleaned and dried at an elevated temperature. It is then maintained at a temperature above 100° C. until used, being assembled while hot. One-hundred grams of trioxymethylene (Reagent Grade) is charged to the pyrolyzer, 500 milliliters (342 grams) of dry n-heptane is charged to the polymerization flask and agitation is started. Nitrogen is passed through the system and is continued at a low flow rate throughout the reaction to provide an oxygen-free atmosphere. About 15 minutes after nitrogen purging is initiated, 5 grams of morpholine is added to the polymerizer and the flask and its contents are then cooled to −78° C., using a Dry Ice-acetone cooling bath. Five milliliters of a one-molar solution of butyl lithium catalyst in n-heptane is injected into the reaction mixture at this temperature. The pyrolyzer is heated to 140° C. and the oxymethylene vapors formed are passed through the U-trap (maintained at a −15° to −18° C. temperature) and introduced at a uniform continuous rate to the polymerizer above the surface of the agitated reaction mixture.

The reaction is maintained at −78° C. for two hours, after which the cooling bath is removed. While oxymethylene generation is continued, the reaction mixture warms to a temperature of about +60° C. in an hour. The reaction is then continued for an additional hour at this temperature. The oxymethylene monomer generator is then shut down and the reaction mixture is cooled to room temperature before nitrogen purging is discontinued. The mixture is discharged from the polymerizer and filtered to recover the precipitated product. The product is washed well with n-heptane and dried at 50° C. under vacuum, 15.9 grams of a fine, white polymeric material is obtained. Chemical analysis shows the product to contain 3.5 percent nitrogen, which value corresponds to a morpholine content of about 7 mole percent. As determined in a Fisher-Johns melting point apparatus, the copolymer begins to soften at 92° C. and melts at approximately 110° C. With continued heating, the molten copolymer exhibits stability up to about 200° C. A 1-gram portion of the copolymer is molded in a plunger-type mold press for 1 minute at 110° C. under a pressure of 4000 p.s.i. The white molded specimen obtained contains no bubbles and exhibits no discoloration or other evidence of thermal degradation.

*Example 2*

Using a polymerizer as described in Example 1, a copolymer is prepared employing 25 grams trioxane and 1 gram of morpholine. The trioxane is added to 250 ml. (302 g.) of nitrobenzene used as the reaction medium and the system is purged with nitrogen. 2 ml. of a 1-molar solution of boron fluoride diethyl etherate catalyst in nitrobenzene is then added to the agitated trioxane-solvent mixture. The reaction is carried out at a temperature of 23° to 29° C. for a period of 7 hours. The copolymer product recovered is a fine, white powder which is found by chemical analysis to contain 3.6 percent nitrogen, equivalent to a morpholine content of about 22.3 percent, by weight.

*Example 3*

An oxymethylene-oxazine copolymer is prepared employing the general procedure and polymerization recipe as outlined in Example 1 with the exception that 20 ml. (18.4 g.) of N-methyl morpholine is used in place of morpholine. Two milliliters of the butyl lithium catalyst solution is employed. In this example, the reaction is conducted at a temperature of −70° C. for 3 hours. The reaction mixture is then warmed in 2 hours to a temperature of +60° C. and is maintained at this temperature for an additional hour before the reaction is stopped, as outlined in Example 1. Twenty-two and seven-tenths grams of a white, fairly fibrous polymeric product is recovered. As determined by nitrogen analysis, this copolymer contains 5.4 percent of N-methyl morpholine by weight. It has an inherent viscosity of 1.48, as determined by measuring at 60° C., a 0.5 percent solution of the copolymer in p-chlorophenol containing 2 percent by weight of a-pinene. The copolymer begins to soften at 167° C., melts around 180° C. and shows stability up to 220° C. A thermally-stable, tough, white molded specimen is obtained by heating the copolymer for 1 minute at 185° C. under 4000 p.s.i. pressure. When subsequently heated between platens of a laboratory arbor press for 1 minute at 360° F. and under 4000 p.s.i. pressure, this molding flows easily, and is converted to a tough, white film, which exhibits no thermal degradation.

*Example 4*

A copolymer is prepared following the general procedure as outlined in Example 1, employing 500 ml. of n-heptane as the solvent medium, oxymethylene monomer generated by pyrolyzing trioxymethylene, 5 grams of N-phenyl morpholine and 2-milliliters of a 1-molar solution of aluminum chloride in nitrobenzene. The reaction is conducted at −70° C. for 4 hours. The reaction mixture is then discharged from the polymerizer and the precipitated product is separated, washed and dried. Twenty-nine and one-tenths grams of a powdery copolymer is obtained which contains 1.15 percent nitrogen, or 13.4 percent of N-phenyl morpholine, by weight. This product melts at 173° C. and is partially stable up to 230° C. When molded at 175° C. as described in previous examples, the copolymer is converted to a pinkish-colored tough molded specimen.

*Example 5*

A copolymer is prepared following the general procedure as used in the previous examples. In this example, 500 ml. of dry toluene is used as the reaction medium; and 5 ml. of N-acetyl morpholine and 2 ml. of the 1-molar solution of butyl lithium in n-heptane are employed. Oxymethylene monomer is supplied by pyrolyzing trioxymethylene. The reaction is conducted at −70° C. for 1.5 hours, after which it warms to a temperature of +23° C. in two hours. The mixture is then heated to a temperature of 76° C. and is maintained at this temperature for an additional 1 to 1½ hours, making a total reaction time of 5 hours. The reaction mixture is then discharged from the polymerizer and filtered as outlined in previous examples. After washing and drying the product precipitate, there is recovered 46.4 g. of a white copolymer which contains 2.8 percent of N-acetyl morpholine by weight, as determined by elemental nitrogen analysis. This product softens and begins to melt at approximately 163° C. When it is heated for one minute in a plunger-type moulding press at 180° C. and under 4000 p.s.i., a tough, white molding is obtained, which shows no evidence of thermal degradation.

It is to be understood that although the invention has been described with specific reference to particular embodiments thereof, it is not to be so limited, since changes and alterations therein may be made which are within the full intended scope of this invention as defined by the appended claims.

What is claimed is:

1. A linear, thermoplastic copolymer composition having a high degree of thermal stability consisting essentially of recurring oxymethylene groups interspersed with groups corresponding to at least one structure selected from the group consisting of

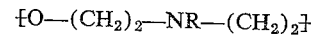

and

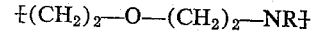

wherein R is selected from the group consisting of hydrogen, halogen, alkyl, acyl and phenyl radicals, said copolymer composition containing from about 83 to 99.97 percent of repeating oxymethylene units and from about 0.03 up to about 17 percent of repeating units derived from a saturated oxazine, the said saturated oxazine units being incorporated in the copolymer during the preparation thereof by an opening of the oxazine ring, said copolymer having a melting point of at least 110° C. and an inherent viscosity of at least 1 as determined by measuring at 60° C. the viscosity of a 0.5% solution of the copolymer in p-chlorophenol which contains 2% by weight of a-pinene.

2. The copolymer composition of claim 1 having an inherent viscosity of at least 1 which contains from about 90 to 99.9 percent of oxymethylene repeating units and from about 0.1 to 10 percent of saturated oxazine repeating units.

3. A process for preparing a linear thermoplastic copolymer composition having a high degree of thermal stability which comprises copolymerizing under substantially anhydrous conditions and in the presence of an ionic-type polymerization catalyst selected from the group consisting of butyl lithium, diethyl zinc, tributyl boron, phenyl magnesium bromide, methyl aluminum dichloride, the halides of boron, aluminum, tin and antimony and their coordinate complexes with organic compounds in which the donor atom is selected from the group consisting of oxygen, nitrogen and sulfur, a compound selected from the group consisting of formaldehyde and trioxane with from about 0.03 to about 17 mol percent of a saturated oxazine having the formula

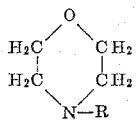

where R is selected from the group consisting of hydrogen, halogen, alkyl, acyl, and phenyl radicals; and recovering a solid copolymer containing repeating oxymethylene units and repeating units derived from the said saturated oxazine.

4. The process of claim 3 in which the saturated oxazine is morpholine.

5. The process of claim 3 in which the saturated oxazine is N-methyl morpholine.

6. The process of claim 3 in which the saturated oxazine is N-acetyl morpholine.

7. The process of claim 3 in which the saturated oxazine is N-phenyl morpholine.

8. A process for preparing a linear, thermoplastic copolymer composition having a high degree of thermal stability which comprises copolymerizing under substantially anhydrous conditions in an inert organic liquid reaction medium, for a time period of 1 to 7 hours, at a temperature within the range of $-80°$ C. to $+100°$ C. and in the presence of a polymerization catalyst selected from the group consisting of butyl lithium, diethyl zinc, tributyl boron, phenyl magnesium bromide, methyl aluminum dichloride and the halides of boron, aluminum, tin, and antimony and their coordinate complexes with organic compounds in which the donor atom is selected from the group consisting of oxygen, nitrogen and sulfur, a compound selected from the group consisting of formaldehyde and trioxane with from about 0.03 to about 17 mol percent of a saturated oxazine having the formula

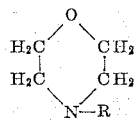

wherein R is selected from the group consitsing of hydrogen, halogen, alkyl, acyl, and phenyl radicals; and recovering a solid copolymer containing repeating oxymethylene units and repeating units derived from the said saturated oxazine.

9. The process of claim 8 in which the catalyst is butyl lithium employed in an amount ranging between 0.001 to 10 percent, by weight of the total monomer charge.

10. The process of claim 8 in which the catalyst is aluminum trichloride employed in an amount ranging between 0.001 to 10 percent, by weight of the total monomer charge.

11. The process of claim 8 in which the catalyst is boron fluoride diethyl etherate employed in an amount ranging between 0.001 to 10 percent, by weight of the total monomer charge.

12. The process of claim 8 which is conducted at a temperature within the range of $-70°$ C. to $+50°$ C. in the presence of between 0.005 to 1 percent, based on the weight of the monomer, of the polymerization catalyst.

13. The process of claim 12 in which the saturated oxazine is morpholine.

14. The process of claim 12 in which the saturated oxazine is N-methyl morpholine.

15. The process of claim 12 in which the saturated oxazine is N-acetyl morpholine.

16. The process of claim 12 in which the saturated oxazine is N-phenyl morpholine.

17. The process of claim 12 in which the catalyst is butyl lithium.

18. The process of claim 12 in which the catalyst is aluminum trichloride.

19. A molded article prepared from the composition of claim 1, said molded article exhibiting substantially no evidence of any thermal degradation.

20. A tough, non-brittle film prepared from the composition of claim 1, said film exhibiting substantially no evidence of any thermal degradation.

References Cited by the Examiner

UNITED STATES PATENTS

| | | | |
|---|---|---|---|
| 2,138,762 | 11/1938 | Harmon | 260—247.7 |
| 2,277,479 | 3/1942 | D'Aleio | 260—67 |
| 2,586,238 | 2/1952 | Lytton | 260—247.7 |
| 2,607,758 | 8/1952 | Hillyer | 260—67.5 |
| 2,768,994 | 10/1956 | MacDonald | 260—67 |
| 2,828,286 | 3/1958 | MacDonald | 260—67 |
| 2,844,561 | 7/1958 | Bechtold et al. | 260—67 |
| 3,027,352 | 3/1962 | Walling et al. | 260—67 |
| 3,043,803 | 7/1962 | Lewis et al. | 260—67 |
| 3,133,048 | 5/1962 | Moore et al. | 260—247.7 |
| 3,136,765 | 6/1964 | Dimroth et al. | 260—247.7 |

FOREIGN PATENTS 486,939   9/1952   Canada.

OTHER REFERENCES

Bachman et al.: Journ. Amer. Chem. Soc., vol. 68, No. 12, 2496–2499 (December 1946), QD 1 A5.

Kunststoffe: Vol. 53, July 1963, pp. 424–436 (English translation, pp. 11–21) TP 986A1K8.

SAMUEL H. BLECH, *Primary Examiner.*

WILLIAM H. SHORT, *Examiner.*

L. M. MILLER, *Assistant Examiner.*